United States Patent

Wakasa et al.

[11] 4,130,406
[45] Dec. 19, 1978

[54] METHOD OF DETECTING BREAKAGE OF GLASS FIBER FILAMENT

[75] Inventors: Isao Wakasa; Yutaka Kawaguchi; Hiroaki Shono, all of Fukushima, Japan

[73] Assignee: Nitto Boseki Co., Ltd., Fukushima, Japan

[21] Appl. No.: 826,931

[22] Filed: Aug. 22, 1977

[30] Foreign Application Priority Data

Sep. 28, 1976 [JP] Japan .............................. 51-116193

[51] Int. Cl.² ............................................. C03B 37/02
[52] U.S. Cl. ....................................... 65/2; 65/11 W; 65/29
[58] Field of Search ........................... 65/2, 11 W, 29

[56] References Cited

U.S. PATENT DOCUMENTS 3,820,967  6/1974  Johnson .......................... 65/11 W X Primary Examiner—Robert L. Lindsay, Jr.
Attorney, Agent, or Firm—Philip Rodman

[57] ABSTRACT

A method of detecting breakages of glass fiber filaments being drawn through orifies of an orifice plate by converting the variation in intensity of radiant light or heat emitted from a bead of molten glass which grows on the undersurface of the orifices plate at an orifice at which a breakage occurs into an electrical signal by a radiation thermometer which is so arranged as to reciprocate horizontally in parallel with both one side and said undersurface of said orifice plate, whereby the breakage may be detected.

10 Claims, 9 Drawing Figures

METHOD OF DETECTING BREAKAGE OF GLASS FIBER FILAMENT

The present invention relates to a method of detecting breakages of glass fiber filaments which are drawn through orifices of an orifice plate.

There has been well known a method of detecting a breakage of a strand into which a number of glass fiber filaments are gathered, which method comprises the steps of making a piezoelectric element in contact with the strand and detecting the breakage of the strand through variation in output of the piezoelectric element in response to variation of the contact pressure between the strand and the piezoelectric element. However, it is impossible in practice to apply this method to each one of thousands of glass fiber filaments which are drawn from a single orifice plate. Even if it should be possible to apply this method to each filament, the contact itself of the filament with the piezoelectric element would tend to cause breakage of the filament. Furthermore, if the piezoelectric element is so arranged as to contact the filament under the minimum contact pressure in order to avoid breakage of the filament the piezoelectric element would not function in a reliable manner. Thus so far there has not yet been proposed a successful method for detecting breakages of glass fiber filaments being drawn so that at present there is no other way than the constant visual inspection by operators of a large number of glass fiber filaments being drawn.

While glass fiber filaments are drawn through extremely densely arranged orifices of an orifice plate, when a glass fiber filament is broken, a bead of molten glass is formed on undersurface of the orifice plate at the orifice at which the breakage has occurred. As time elapses, the bead of molten glass grows so that its weight increases and consequently the bead of molten glass falls and makes contact with the adjacent filaments, thereby breaking them. Furthermore, when the spacing between the adjacent orifices is extremely small, the bead of molten glass grows to expand at the undersurface of the orifice plate and joins with the adjacent inverted cones of molten glass. As a result, the more the bead of glass expands, the more glass filaments are broken. Therefore a breakage of a glass fiber filament must be detected as early as possible so that a suitable countermeasure may be taken.

One of the objects of the present invention is therefore to provide a method of easily detecting any breakages of glass fiber filaments which are being drawn, without any physical contact with the glass fiber filaments.

To this end, the present invention provides a method of detecting breakages of glass fiber filaments being drawn through orifices of an orifice plate, comprising the steps of arranging a radiation thermometer in such a way that a portion of a glass fiber filament at least immediately below at least one of said orifices is focused on the field of view of said radiation thermometer, and detecting the variation in output from said radiation thermometer when as the result of a breakage of the filament through said one orifice a bead of molten glass grows on the undersurface of said orifice plate at said one orifice and is focused on said field of view of said radiation thermometer.

When the orifice plate has a large number of orifices arranged in rows and columns, said radiation thermometer may be so arranged that the glass fiber filaments through any one of said rows of orifices are focused on the field of view of said radiation thermometer in overlapping relationship and reciprocated horizontally in directions perpendicular to said rows of orifices to scan successively and sequentially the glass fiber filaments through respective rows of orifices to detect any breakage in each row.

The present invention will become more apparent from the following description of one preferred embodiment thereof taken in conjunction with the accompanying drawings.

Figure 1:
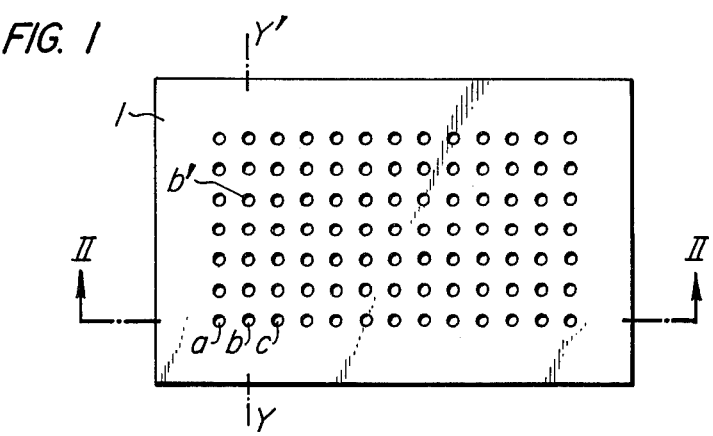
FIG. 1 is a schematic top view of an orifice plate used in a glass fiber filament spinning apparatus to which is applied the method of the present invention.
Figure 2A:
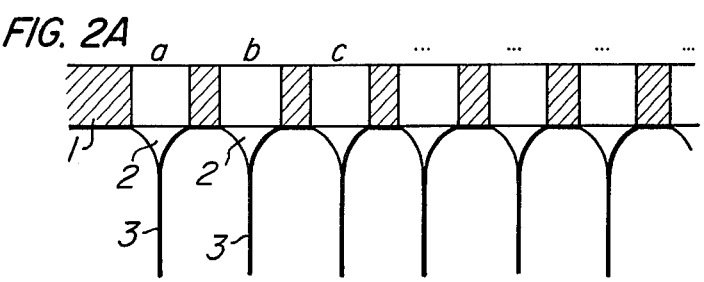
FIG. 2A is a cross sectional view taken along the line II—II of FIG. 1 illustrating glass filaments being drawn in a stable manner.
Figure 2B:
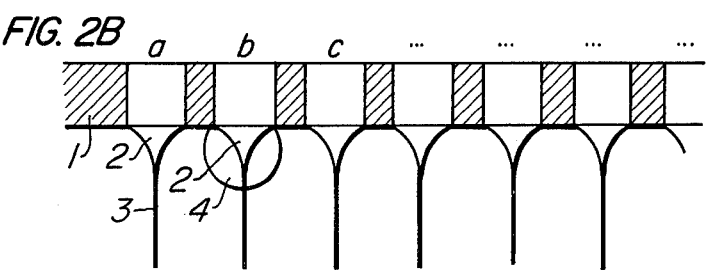
FIG. 2B is a view similar to FIG. 2A but illustrating a bead of molten glass which grows on the undersurface of the orifice plate at the orifice at which a breakage occurred.
Figure 2C:
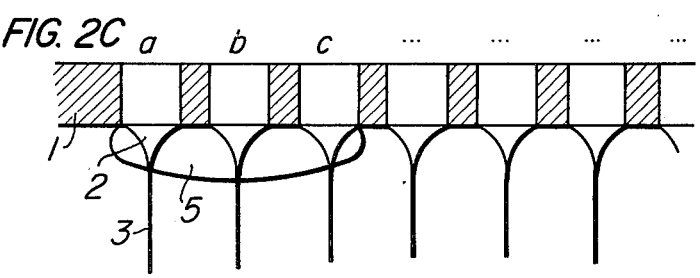
FIG. 2C is a view similar to FIG. 2B but illustrating the bead of molten glass which grows and expands itself over the undersurface of the orifice plate.

In FIG. 1 there is shown an orifice plate 1 formed with 800 to 6,000 orifices a, b, c, and so on. FIGS. 2A, 2B and 2C are sectional views taken along the line II—II of FIG. 1, and FIG. 2A shows glass filaments being drawn in a stable manner. That is, the molten glass passes through the orifices a, b, c and so on under the head pressure of molten glass in a conventional glass furnace and forms inverted cones 2 of molten glass at the underface of the orifice plate 1, and the glass filaments 3 are drawn from the cones 2 of molten glass in a stable manner. Since all of the inverted cones of molten glass are formed in a same size as long as the glass filaments are drawn in a stable manner, the cones of molten glass formed at the orifices behind those along the line II—II of FIG. 1 overlap the cones of molten glass along the line II—II so that the former cannot be seen. For instance, the cones of molten glass formed at the orifices in a row Y—Y' are in line with each other so that only the cone 2 of molten glass at the foremost orifice b is visible.

However after the filament drawn from the cone of molten glass at the orifice b' has been broken by accident, the molten glass which passes through the orifice b' under the head pressure of molten glass forms a spherical molten glass bead 4 on the undersurface of the orifice plate 1, and this glass bead 4 is visible behind the cone 2 of molten glass formed at the orifice b as shown in FIG. 2B. As time elapses, the glass bead 4 grows gradually and finally falls down by its own weight. The glass bead 4 falls down slowly at the initial stage because of the viscosity of molten glass, but as its weight increases, it falls at increased speed and makes contact with the surrounding filaments 3 being drawn and, as a result, also breaks the latter.

Furthermore depending upon the distance between the adjacent orifices and/or the wetting of molten glass at a drawing temperature, the molten glass bead 4 grows over the undersurface of the orifice plate 1 and finally joins with adjacent cones of molten glass as shown in FIG. 2C so that a large-sized glass bead 5 is formed. The large glass bead 5 further grows so that the filaments 3 are broken one by one.

The present invention was made to overcome these problems. According to the invention, a radiation thermometer is used to monitor the variation in intensity of radiant light or heat emitted from molten glass on the undersurface of the orifice plate 1 as the cone 2 of molten glass is formed and grows into the molten glass bead 4 or 5 after the glass filament 3 drawn from said cone 2 has been broken, as described above with reference to FIGS. 2B and 2C; and the variation in intensity of radiant light or heat is converted into an electrical signal to detect the breakage of the glass fiber filament.

Figure 3:
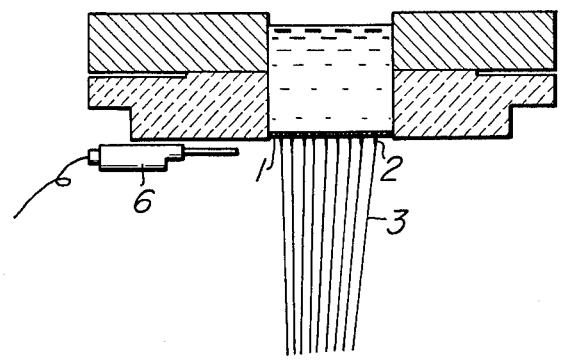
FIG. 3 is a fragmentary side view of a glass furnace with an orifice and a radiation thermometer arranged in accordance with the present invention.
Figure 4:
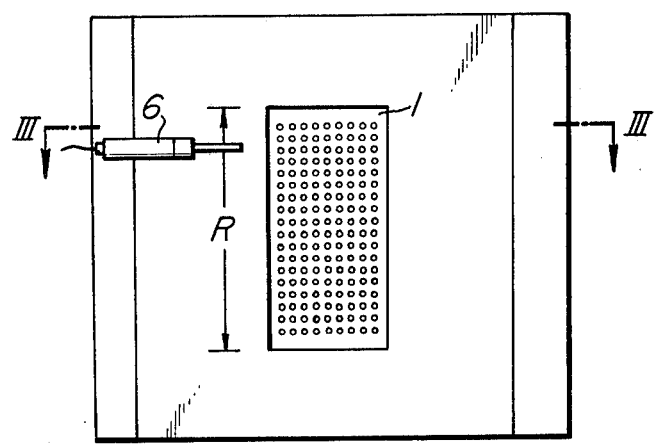
FIG. 4 is a bottom view thereof in which the radiation thermometer is arranged to reciprocate in the longitudinal direction of the orifice plate.
Figure 6:
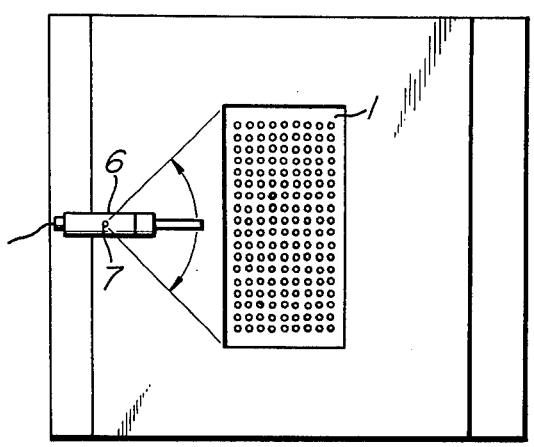
FIG. 6 is a bottom view of the apparatus shown in FIG. 3 in which the radiation thermometer is arranged to pivot about a vertical axis.

Referring to FIGS. 3 and 4, a radiation thermometer is positioned on one side of the orifice plate 1 and is spaced apart from the orifice plate 1 as closely as possible as long as the function of the radiation thermometer 6 is not adversely affected by heat radiated from the molten glass. The radiation thermometer 6 is directed in parallel with the undersurface of the orifice plate 1 but in such a manner that the undersurface of the orifice plate 1 is out of the field of view of the radiation thermometer 6. Furthermore the radiation thermometer 6 is so arranged as to reciprocate by any suitable drive means (not shown) along the side of the orifice plate 1 within a range R in the directions indicated by double-pointed arrow in FIG. 4. Alternatively the radiation thermometer 6 may be pivoted at a point 7 corresponding to the midpoint of said reciprocation range so as to scan the orifice plate 1 from one end to the other end, as shown in FIG. 6.

Any suitable conventional radiation thermometers, such as optical pyrometer, thermocouple, silicon-cell thermometer, amplifier type thermometer and so one, may be used as the radiation thermometer 6. In order to avoid the adverse effects from the high temperature of the orifice plate 1 and the high temperature air surrounding the orifice plate 1, it is required to enclose the radiation thermometer 6 with a cylindrical casing which is normally cooled by a suitable cooling liquid and/or gas. Furthermore in order to increase the variation of output in the event of breakage, thereby increasing the degree of accuracy in detection of the breakage, preferably the field of view of the radiation thermometer may be as small as practicable.

The present invention will be described in detail with a silicon-cell type thermometer or "Pyroeye SBX-600–900" a product of CHINO SEISAKUSHO K.K., but it is to be understood that the present invention is not limited thereto and that any other suitable conventional thermometer may be used as described above when its sensitivity and other specifications are satisfactory.

With the above radiation thermometer, the experiments were conducted in order to measure the variation of the output from the radiation thermometer with respect to time after a breakage had occurred. The results are shown in Table 1 below.

Table 1

| Time | Test No. | 1 | 2 | 3 | 4 | 5 | 6 |
|---|---|---|---|---|---|---|---|
| 0 second | | | | 0.25 – 0.26 mV | | | |
| 8 | | | | | | | |
| 10 | | 0.3 | | | 0.3 | | |
| 20 | | 1.0 | | | 0.8 | | |
| 30 | | 2.5 | | | 1.0 | | |
| 35 | | — | 0.32 | | — | 0.3 | |
| 40 | | — | 1.0 | | — | 1.0 | |
| 45 | | — | — | — | — | — | — |
| 50 | | — | 1.8 | 0.35 | 1.2 | 1.0 | 0.35 |
| 60 | | 5.0 | 3.0 | 1.2 | 1.5 | 1.2 | 1.0 |

Remarks:
(1) The maximum field of view of the radiation thermometer: 15 mm
(2) Distance between the orifice plate and the center of the field of view of the thermometer:
   Test Nos. 1 and 4 : 10 mm
   Test Nos. 2 and 5 : 15 mm
   Test Nos. 3 and 6 : 20 mm
(3) Drawing temperature: 1,170° C
(4) Breakage positions:
   Test Nos. 1, 2 and 3:
      Breakages occurred in the range between the side edge closer to the radiation thermometer and the center line of the orifice plate.
   Test Nos. 4, 5 and 6:
      Breakages occurred in the range between the center line and the side edge remote from the radiation thermometer of the orifice plate.

Figure 5A:
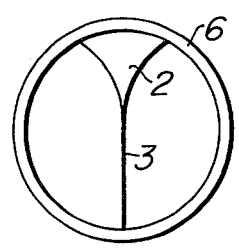
FIG. 5A shows the field of view of the radiation thermometer when the glass filaments are drawn in a stable manner.
Figure 5B:
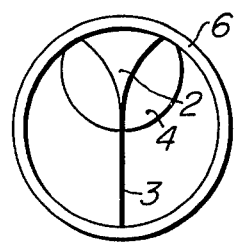
FIG. 5B shows the field of view when a breakage has occurred so that a bead of molten glass is growing.

When the filaments 3 are drawn in a stable manner, the cone 2 of molten glass and the filament 3 are viewed in the field of view of the radiation thermometer 6 as shown in FIG. 5A, but when some filament 3 is broken, in addition to the cone 2 of molten glass and the filament 3, the bead of molten glass 4 is viewed as shown in FIG. 5B. When the filaments 3 are drawn in a stable manner as shown in FIG. 5A, the ratio between the area of the cone 2 of molten glass and the filament 3 focused on the field of view of the radiation thermometer and the area of the field of view remains unchanged so that the output from the radiation thermometer 6 is constant. However once a breakage occurs, the bead 4 of molten glass is formed as shown in FIG. 5B, and as time elapses the bead 4 of molten glass grows greater. As a result, the ratio of the area of the bead 4 of molten glass focused to the area of the field of view increases so that the intensity of radiant light or heat intercepted by the radiation thermometer 6 increases and consequently the output from the radiation thermometer 6 increases accordingly.

Since the size of the cone 2 of molten glass which is dependent upon the diameter of the orifice, the density of orifices in the orifice plate and other factors is usually very small, it is rather difficult to focus the cone 2 of molten glass on the field of view of the radiation thermometer. Therefore the radiation thermometer 6 may be so arranged that the filament 3 immediately below the inverted cone 2 of molten glass may be focused on the field of view because the bead 4 of molten glass outgrows the inverted cone 2 and immediately comes into the field of view of the radiation thermometer. As a result the occurrence of any breakage may be detected in a manner substantially similar to that described above with reference to FIG. 5B. In the case as shown in FIG. 6 in which the radiation thermometer 6 is pivoted to scan the orifice plate 1, the thermometer should be rather intentionally arranged such that the cones of molten glass are out of the view from the thermometer but the filaments immediately below the cones are focused on the field of view. In this case the pivotal movement of the thermometer results in variation of the number of filaments within the field of view but such variation has no effect on the output from the thermometer so far as the filaments are being drawn in a stable manner, since the glass filaments are in a state of solid having no substantial radiation of light or heat. When one of filaments is broken, a bead of molten glass will be focused on the field of view of the thermometer so that the output from the thermometer increases. Then the broken filament will be found on a line in the axial direction of the thermometer at a position at which the output from the thermometer has increased.

In general it takes about 70 seconds from time a breakage occurs so that a bead 4 of molten glass is formed and starts to grow to the time the bead of molten glass falls down by its own increased weight. Therefore it may be desired that the variation in output from the radiation thermometer is detected within 60 seconds, preferably 40 to 50 seconds, and in response to the detected variation an electrical signal is issued for actuating a suitable control device so as to cope with the end breakage of the filament.

As seen from Table 1, the shorter the spacing between the orifice plate and the center of the field of view of the radiation thermometer, the sooner the variation in output from the radiation thermometer appears so that it is preferable to position the radiation thermometer as close to the orifice plate as practicable. In the preferred embodiment of the present invention, the electrical signal representative of the occurrence of breakage is generated when the output from the radiation thermometer rises to about 0.4 mV.

Prior to the experiments it was expected that the variation in output from the radiation thermometer in response to the breakage in the range between the side edge closer to the radiation thermometer and the center line of the orifice plate would be different from the variation in output in response to the breakage that occurred in the range between the center line of the orifice plate and the side edge thereof remote from the radiation thermometer. However, as is seen from Table 1 the difference between them is extremely small and is negligible.

In summary, according to the present invention the variation in intensity of radiant light or heat emitted from a bead of molten glass which grows on the undersurface of the orifice plate at the orifice at which a breakage occurs is converted into an electrical signal by the radiation thermometer, whereby the breakage may be detected. Therefore the present invention is particularly advantageous when glass fiber filaments are drawn with an orifice plate having an extremely high density of orifices.

What is claimed is:

1. A method of detecting breakages of glass fiber filaments being drawn through orifices of an orifice plate, comprising the steps of arranging a radiation thermometer in such a way that a portion of a glass fiber filament at least immediately below at least one of said orifices is focused on the field of view of said radiation thermometer, and sensing by means of said radiation thermometer a variation in intensity of radiant light or heat emitted from a bead of molten glass when as a result of a breakage of the filament through said one orifice the molten glass bead grows on the undersurface of said orifice plate at said one orifice and said bead growth is focused on said field of view of said radiation thermometer to cause a variation in output from said radiation thermometer, whereby the breakage of the filament is detected based on said variation in output from said radiation thermometer.

2. A method of detecting breakages of glass fiber filaments as set forth in claim 1, wherein said radiation thermometer is so arranged that an inverted cone of molten glass formed at said one orifice is focussed on said field of view of said radiation thermometer.

3. A method of detecting breakages of glass fiber filaments being drawn through orifices of an orifice plate having a large number of orifices arranged in rows and columns as set forth in claim 1, comprising the steps of arranging said radiation thermometer in such a way that the glass fiber filaments through orifices in any one of said rows of orifices are focussed on the field of view of said radiation thermometer in overlapped relationship, and reciprocating said radiation thermometer horizontally in the directions perpendicular to said rows of orifices to scan successively and sequentially the glass fiber filaments through respective rows of orifices to detect any breakage in each row.

4. A method of detecting breakages of glass fiber filaments as set forth in claim 1, wherein said radiation thermometer is pivoted so as to be swingable about a vertical axis horizontally spaced apart by a suitable distance from the midpoint between ends of one side closest to said radiation thermometer of said orifice plate.

5. A method of detecting breakages of glass fiber filaments as set forth in claim 1, wherein said radiation thermometer is responsive to the variation in intensity of radiant light or heat emitted from objects focused on the field of view of said radiation thermometer to generate an electrical signal.

6. A method of detecting breakages of glass fiber filaments as set forth in claim 5, wherein said radiation thermometer is an optical pyrometer.

7. A method of detecting breakages of glass fiber filaments as set forth in claim 5, wherein said radiation thermometer is a thermocouple.

8. A method of detecting breakages of glass fiber filaments as set forth in claim 5, wherein said radiation thermometer is a silicon-cell type thermometer.

9. A method of detecting breakages of glass fiber filaments as set forth in claim 5, wherein said radiation thermometer is an amplification type thermometer.

10. A method of detecting breakages of glass fiber filaments as set forth in claim 5, wherein said radiation thermometer is enclosed within a casing which is normally cooled.

* * * * *